US007646708B2

(12) United States Patent
McGee et al.

(10) Patent No.: US 7,646,708 B2
(45) Date of Patent: Jan. 12, 2010

(54) NETWORK RESOURCE TEAMING COMBINING RECEIVE LOAD-BALANCING WITH REDUNDANT NETWORK CONNECTIONS

(75) Inventors: Michael Sean McGee, Round Rock, TX (US); Mark R Enstone, Austin, TX (US); James R Walker, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 687 days.

(21) Appl. No.: 11/208,689

(22) Filed: Aug. 22, 2005

(65) Prior Publication Data

US 2007/0025252 A1 Feb. 1, 2007

Related U.S. Application Data

(60) Provisional application No. 60/704,676, filed on Aug. 1, 2005.

(51) Int. Cl.
*G06F 11/00* (2006.01)
(52) U.S. Cl. ..................................... 370/229; 370/463
(58) Field of Classification Search .................. 370/217, 370/218, 221–223, 225–228, 242–245, 247, 370/251, 229, 463; 709/104–106, 226, 229
See application file for complete search history.

(56) References Cited

U.S. PATENT DOCUMENTS 6,151,297 A * 11/2000 Congdon et al. ............. 370/216
7,145,866 B1 * 12/2006 Ting et al. .................... 370/225

OTHER PUBLICATIONS

Hewlett-Packard Development Company, ProLiant Essentials Intelligent Networking—Dual Channel Teaming with Microsoft Windows enviornments White Paper, 2004.*
Hewlett-Packard, hp ProLiant network adapter teaming technical white paper, Jun. 2003.*

* cited by examiner

*Primary Examiner*—Derrick W Ferris
*Assistant Examiner*—Nihar Patel

(57) ABSTRACT

A computer system teams its network resources by apportioning each of the one or more network resources into one of two or more groups. The resources of each of the groups have links that are operative to be coupled in parallel to a different one of two or more network devices that provide connectivity to a network. One of the two or more groups is selected to be a primary group. A team layer2 address is assigned to one of the resources apportioned to the selected group. Each of the resources of the selected group is enabled to receive on the team layer2 address. The network device to which the selected group is coupled is enabled to load balance data received from the network among the resources of the selected group. Data transmitted from the system to the network is load-balanced over all of the resources independent of the group to which they belong.

23 Claims, 12 Drawing Sheets

NETWORK RESOURCE TEAMING COMBINING RECEIVE LOAD-BALANCING WITH REDUNDANT NETWORK CONNECTIONS

This application claims the benefit of U.S. Provisional Application No. 60/704676, filed Aug. 1, 2005.

BACKGROUND

Computers and other devices are commonly interconnected to facilitate communication among one another using any one of a number of available standard network architectures and any one of several corresponding and compatible network protocols. Packet switched network protocols are commonly employed with a number of architectures such as the Ethernet® standard. One of the most basic and widely implemented network types is the local area network (LAN). In its simplest form, a LAN is a number of devices (e.g. computers, printers and other specialized peripherals) connected to one another over a common broadcast domain using some form of signal transmission medium such as coaxial cable. Multiple LANs may be coupled together as two or more sub-networks of a more complex network via routers or equivalent devices, each of the LANs having a distinct broadcast domain.

Computers and other devices employ network resources as a requisite interface with which to communicate over a network such as a LAN. These network resources are sometimes referred to as network adapters or network interface cards (NICs). An adapter or NIC typically has at least one port through which a physical link may be provided between the processing resources of its network device and the transmission medium of a network. Data generated for transmission by the processing resources of one network device, is first formatted (as packets in the case of packet switched networks) in accordance with its resident protocol layer (a software process typically executing in conjunction with the device's OS (operating system)). These packets are then framed and transmitted through the device's network resources, over the transmission media to the network resources of a second network device similarly coupled to the network. The data received by an adapter port of the second device is passed to and then deformatted by the protocol layer resident in the O/S of the second network device. The deformatted data is presented to the processing resources of the second device. The adapters or NICs are commercially available and are designed to support one or more variations of standard network architectures and known topologies, including Ethernet as described above.

In an Ethernet environment, each network device and its links to the network are identified by the other devices on the network using a protocol address (e.g. Internet Protocol (IP)) and a media access control (MAC) address in accordance with layer 3 and layer 2 of the OSI networking model respectively. The protocol address is associated with a virtual interface established by software between a device's adapter hardware and the protocol layer executed by its OS. The MAC address is uniquely associated with the adapter hardware itself and is typically hard-programmed into each device at the time of manufacture. Provision is often made such that this preassigned MAC address can be overwritten through software command during initialization of the device. Devices coupled to a common broadcast domain of an Ethernet network identify each other by the MAC address. Devices coupled to disparate broadcast domains communicate using their IP addresses over a device such as a router that couples the two domains.

Thus, a network device such as a server can be directly coupled to one or more physical networks or sub-networks through one or more distinct adapter ports coupled to each of the one or more networks or sub-networks. Each adapter port and its associated protocol interface are identified by a unique MAC address and IP address respectively. In the alternative, a single adapter port may be coupled to a special switch that can be programmed to provide connections to devices belonging to one or more logical sub-networks called virtual LANs (VLANs). The VLANs are essentially superimposed or overlaid on the same physical network to create multiple logical networks sharing the same physical broadcast domain. A virtual interface to the device's protocol layer is created for each of the VLANs and thus each VLAN virtual interface is assigned its own protocol address. The single adapter port, however, is still known to the devices comprising the various VLANs by a single MAC address.

To improve the reliability of a network, redundant links have been established with the same network through multiple adapter ports in the event that one of the links fails. Redundant links can also provide an opportunity to increase throughput of the connection through aggregation of the throughput through the redundant links. Redundant links to the same network can be established through multiple adapter ports coupled to a network switch for example. This is sometimes referred to as multi-homing. While providing some of the benefits of redundant links, implementation of multi-homing to achieve redundancy is difficult for reasons known to those of skill in the art.

Redundant links can also be accomplished by teaming two or more adapter ports together to appear as a single virtual link. Adapter teams are typically made up of two or more adapter ports logically coupled in parallel using a teaming driver. The teaming driver is a software routine executed by the OS that presents a common virtual interface to its protocol layer for the entire team of resources rather than individual interfaces for each adapter port as previously discussed. A single protocol address is assigned to this common virtual interface. Also, a single team MAC address is assigned to the team from the set of MAC addresses assigned to each of the adapter ports of the team. Thus, other devices on the network see the team of adapter ports as a single virtual adapter port.

The throughput of the individual port members of the team can be aggregated for data transmitted from and received by the network device employing the team, depending upon the nature of the team configured. Throughput aggregation is commonly optimized using one of a number of known load-balancing algorithms, executed by the teaming driver, to distribute frames between the teamed NIC ports. The use of aggregated teamed adapter ports also inherently provides fault tolerance because the failure of one of the aggregated links does not eliminate the entire link. The aggregation of network interface resources through teaming is particularly beneficial in applications such as servers, as the demand for increased throughput and reliability of a network connection to a server is typically high.

Teams of network resources can be of various types providing different benefits. Network fault tolerant (NFT) teams commonly employ two or more network adapter or NIC ports redundantly coupled to the same network through a switch. One port is configured to be "active" and is designated as the "primary" adapter port. Each of the remaining members of the team is placed in a "standby" or "inactive" mode and is designated as a "secondary" member of the team. The primary adapter port is assigned a team MAC address from the set of MAC addresses associated with each of the team members. The secondary members are each assigned one of the remaining MAC addresses of the set. A NIC port in standby mode remains largely idle (it is typically only active to the limited extent necessary to respond to system test inquiries to indicate that it is still operational) until activated in a failover process. Failure detection and failover processes are typically executed by the teaming driver. Failover replaces the failed primary adapter port with one of the secondary team members, rendering the failed adapter port idle and secondary while activating one of the secondary adapters and designating it as the new primary for the team. In this way, interruption of a network connection to a critical server may be avoided notwithstanding the existence of a failed network adapter card or port.

Transmit load-balanced (TLB) teams typically aggregate and load-balance data transmitted from two or more active members of the team to other devices over the network in accordance with some load-balancing policy executed by the teaming driver. Several types of load-balancing algorithms may be employed with the teaming driver typically executing the algorithm. As with the NFT teams described above, only one of the active team members is designated as the primary for the team. Because the primary is the only member of the team that has been assigned the team MAC address, and this single MAC address is the one by which all devices on the network communicate with the team, it necessarily handles all of the data received by the team from the network. As a result, no aggregation of the receive traffic is available. TLB teams are particularly useful in applications where the transmit traffic is significantly greater than the traffic received by the team. One such application is a database server that provides data to a large number of clients in response to a relatively smaller amount of request traffic generated by those clients.

Switch-assisted load-balanced (SLB) teams are able to aggregate both transmit and receive data over all active team members. This is accomplished through a special switch interposed between the team and the network that has the intelligence to create a single virtual port for all of the physical ports coupling the team adapters and the switch. In this cases no adapter is designated as the primary and each team adapter is assigned the same team MAC address. The switch recognizes all packets it receives containing the team MAC address as being destined for the virtual port. The switch routes each such packet to one of the port members of the virtual port based on a load-balancing algorithm executed by the switch. The transmit data is typically load-balanced by the teaming driver in the manner used for TLB teams. SLB teams also provide fault tolerance by default, as team members that cease to function as a result of a fault will be inactivated and only the aggregated throughput of the team will be reduced as a result.

Certain network configurations are designed to achieve redundancy of connections between a system and the network using multiple coupling devices such as switches. Switch redundant configurations coupled to a server employing redundant links using a TLB or NFT team can result in members of the adapter team being coupled to the network through a different one of the redundant switches (and thus through separate paths of the network). To ensure that all team members are coupled to the same broadcast domain (i.e. same layer-2 network or subnet), these switch-redundant configurations require that all of the redundant devices (and therefore the team members) ultimately be interconnected in some way—either directly or by way of uplinks to a common third device (e.g. a backbone or core switch).

BRIEF DESCRIPTION OF THE DRAWINGS

For a detailed description of embodiments of the invention, reference will now be made to the accompanying drawings in which.

NOTATION AND NOMENCLATURE

Figure 1:
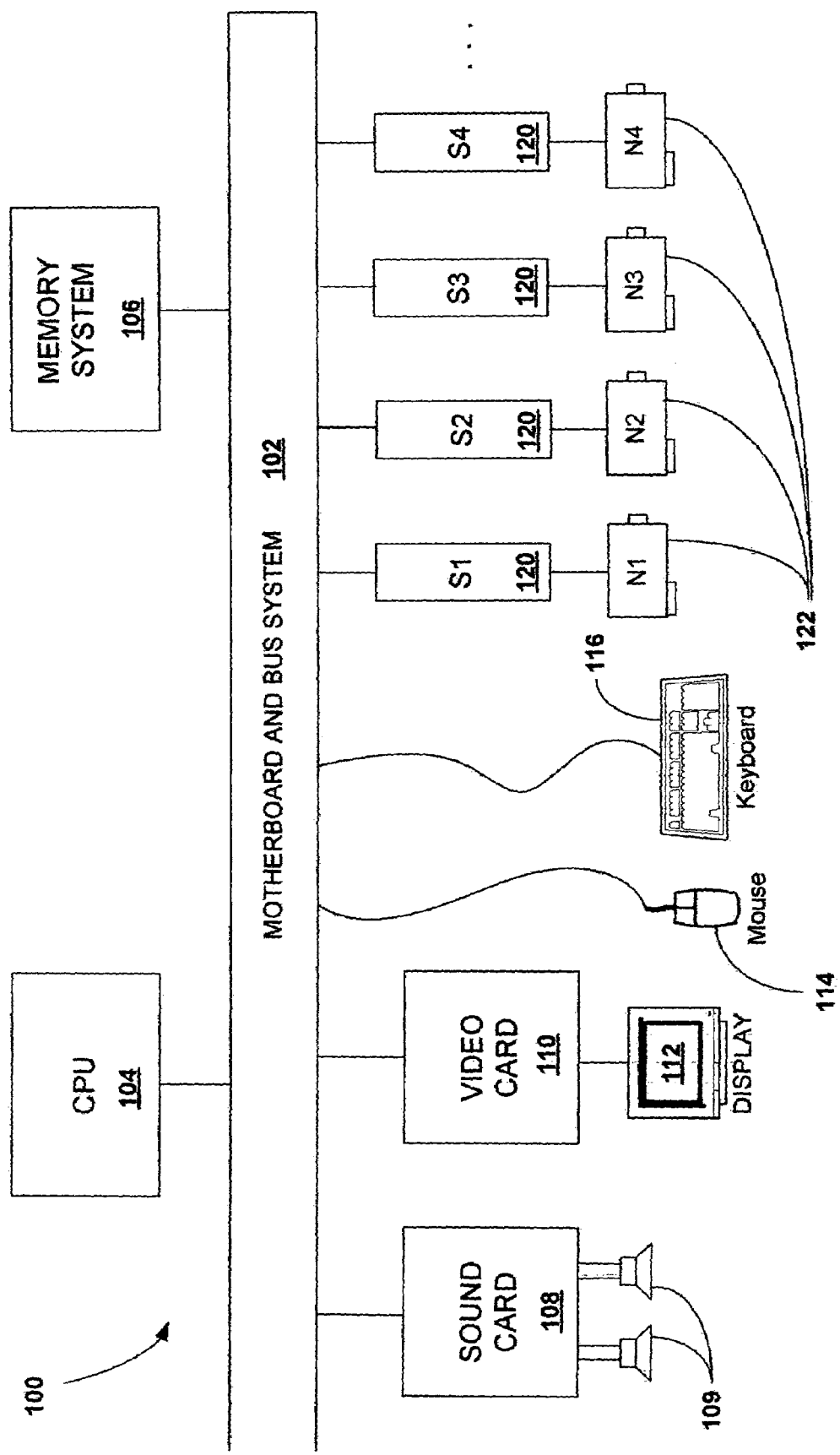
FIG. 1 is a block diagram that illustrates various features of a computer system, including some features by which the computer system is coupled to a network in accordance with an embodiment of the present invention.

Certain terms are used throughout the following description and in the claims to refer to particular features, apparatus, procedures, processes and actions resulting therefrom. For example, the term network resources is used to generally denote network interface hardware such as network interface cards (NICs) and other forms of network adapters known to those of skill in the art. Moreover, the term MC or network adapter may refer to one piece of hardware having one port or several ports. While effort will be made to differentiate between NICs and NIC ports, reference to a plurality of NICs may be intended as a plurality of interface cards or as a single interface card having a plurality of MC ports. Those skilled in the art may refer to an apparatus, procedure, process, result or a feature thereof by different names. This document does not intend to distinguish between components, procedures or results that differ in name but not function. In the following discussion and in the claims, the terms "including" and "comprising" are used in an open-ended fashion, and thus should be interpreted to mean "including, but not limited to . . . ".

DETAILED DESCRIPTION

The following discussion is directed to various embodiments of the invention. Although one or more of these embodiments may be preferred, the embodiments disclosed should not be interpreted as, or otherwise be used for limiting the scope of the disclosure, including the claims, unless otherwise expressly specified herein. In addition, one skilled in the art will understand that the following description has broad application, and the discussion of any particular embodiment is meant only to be exemplary of that embodiment, and not intended to intimate that the scope of the disclosure, including the claims, is limited to that embodiment. For example, while the various embodiments may employ one type of network architecture and/or topology, those of skill in the art will recognize that the invention(s) disclosed herein may be readily applied to all other compatible network architectures and topologies as known to those of skill in the art.

Heretofore, load-balancing of data received by a team of network resources has employed a switch that implements one of a number of port-trunking algorithms that were originally developed for load balancing traffic transmitted between switches. These switches treat their ports as a single virtual trunk by routing received data to any one of their ports in accordance with the load-balancing algorithm. This SLB team of resources is therefore treated by the switch as if the team is coupled to it over a single virtual port trunk. Data received by the switch and destined for the team can be distributed to any member of the team by way of any of the output ports making up the trunk to which the members are coupled. One of the limitations of this technique is that all team members must be coupled to the same SLB (i.e. port-trunking capable) switch and thus, the same virtual port trunk.

Because splitting the resources of an SLB team between different switches is not permitted using conventional port-trunking techniques, users have been forced to choose between the benefits of network redundancy and settling for a TLB or NFT team, or they have had to forego switch redundancy to achieve receive traffic aggregation and load-balancing. Embodiments of the invention as described below permit users to realize the benefits of redundant connections to a network (e.g. eliminating single points of failure), as well as to achieve greater receive throughput through receive aggregation and load-balancing.

FIG. 1 is a block diagram of a computer system 100 that illustrates various features of a computer system 100 that may be used to couple it to a network in accordance with an embodiment of the present invention. The computer system 100 can be an industry standard server or any computer or peripheral system that can be coupled to a network, and may include a motherboard and bus system 102 coupled to at least one central processing unit (CPU) 104, a memory system 106, a video card 110 or the like, a mouse 114 and a keyboard 116. The motherboard and bus system 102 can be any kind of bus system configuration, such as any combination of the following: a host bus, one or more peripheral component interconnect (PCI) buses, an industry standard architecture (ISA) bus, an extended ISA (EISA) bus, a microchannel architecture (MCA) bus, etc. Also included but not shown are bus driver circuits and bridge interfaces, etc., as are known to those skilled in the art.

The CPU 104 can be any one of several types of microprocessors and can include supporting external circuitry typically used in industry standard servers, computers and peripherals. The types of microprocessors may include the 80486, Pentium®, Pentium II®. etc. all microprocessors from Intel Corp., or other similar types of microprocessors such as the K6® microprocessor by Advanced Micro Devices. Pentium® is a registered trademark of Intel Corporation and K6® is a registered trademark of Advanced Micro Devices, Inc. Those of skill in the art will recognize that processors other than Intel compatible processors can also be employed. The external circuitry can include one or more external caches (e.g. a level two (L2) cache or the like (not shown)). The memory system 106 may include a memory controller or the like and may be implemented with one or more memory boards (not shown) plugged into compatible memory slots on the motherboard, although any memory configuration is contemplated. The CPU 104 may also be a plurality of such processors operating in parallel.

Other components, devices and circuitry may also be included in the computer system 100 that are not particularly relevant to embodiments of the present invention and are therefore not shown for purposes of simplicity. Such other components, devices and circuitry are typically coupled to the motherboard and bus system 102. The other components, devices and circuitry may include an integrated system peripheral (ISP), an interrupt controller such as an advanced programmable interrupt controller (APIC) or the like, bus arbiter(s), one or more system ROMs (read only memory) comprising one or more ROM modules, a keyboard controller, a real time clock (RTC) and timers, communication ports, non-volatile static random access memory (NVSRAM), a direct memory access (DMA) system, diagnostics ports, command/status registers, battery-backed CMOS memory, etc.

The computer system 100 may further include one or more output devices, such as speakers 109 coupled to the motherboard and bus system 102 via an appropriate sound card 108, and monitor or display 112 coupled to the motherboard and bus system 102 via an appropriate video card 110. One or more input devices may also be provided such as a mouse 114 and keyboard 116, each coupled to the motherboard and bus system 102 via appropriate controllers (not shown) as is known to those skilled in the art. Other input and output devices may also be included, such as one or more disk drives including floppy and hard disk drives, one or more CD-ROMs, as well as other types of input devices including a microphone, joystick, pointing device, etc. The input and output devices enable interaction with a user of the computer system 100 for purposes of configuration, as further described below. It will be appreciated that different combinations of such input/output and peripheral devices may be used in various combinations and forms depending upon the nature of the computer system.

The motherboard and bus system 102 is typically implemented with one or more expansion slots 120, individually labeled S1, S2, S3, S4 and so on, where each of the slots 120 is operable to receive compatible adapter or controller cards configured for the particular slot and bus type. Typical devices configured as adapter cards include network interface cards (NICs), disk controllers such as a SCSI (Small Computer System Interface) disk controller, video controllers, sound cards, etc. The computer system 100 may include one or more of several different types of buses and slots known to those of skill in the art, such as PCL ISA, EISA, MCA, etc. In an embodiment illustrated in FIG. 1, a plurality of NIC adapter cards 122, individually labeled N1, N2, N3 and N4 each providing a single adapter port are shown coupled to the respective slots S1-S4. The bus interconnecting slots 120 and the NICs 122 is typically dictated by the design of the adapter card itself.

As described more fully below, each of the NICs 122 enables the computer system to communicate through at least one port with other devices on a network to which the MC ports are coupled. The computer system 100 may be coupled to at least as many networks as there are NICs (or NIC ports) 122. When multiple NICs or NIC ports 122 are coupled to the same network as a team, each provides a separate and redundant link to that same network for purposes of load balancing and/or fault tolerance. Additionally, two or more of the NICs (or NIC ports) 122 may be split between distinct paths or segments of a network that ultimately connect to a core switch.

Figure 2:
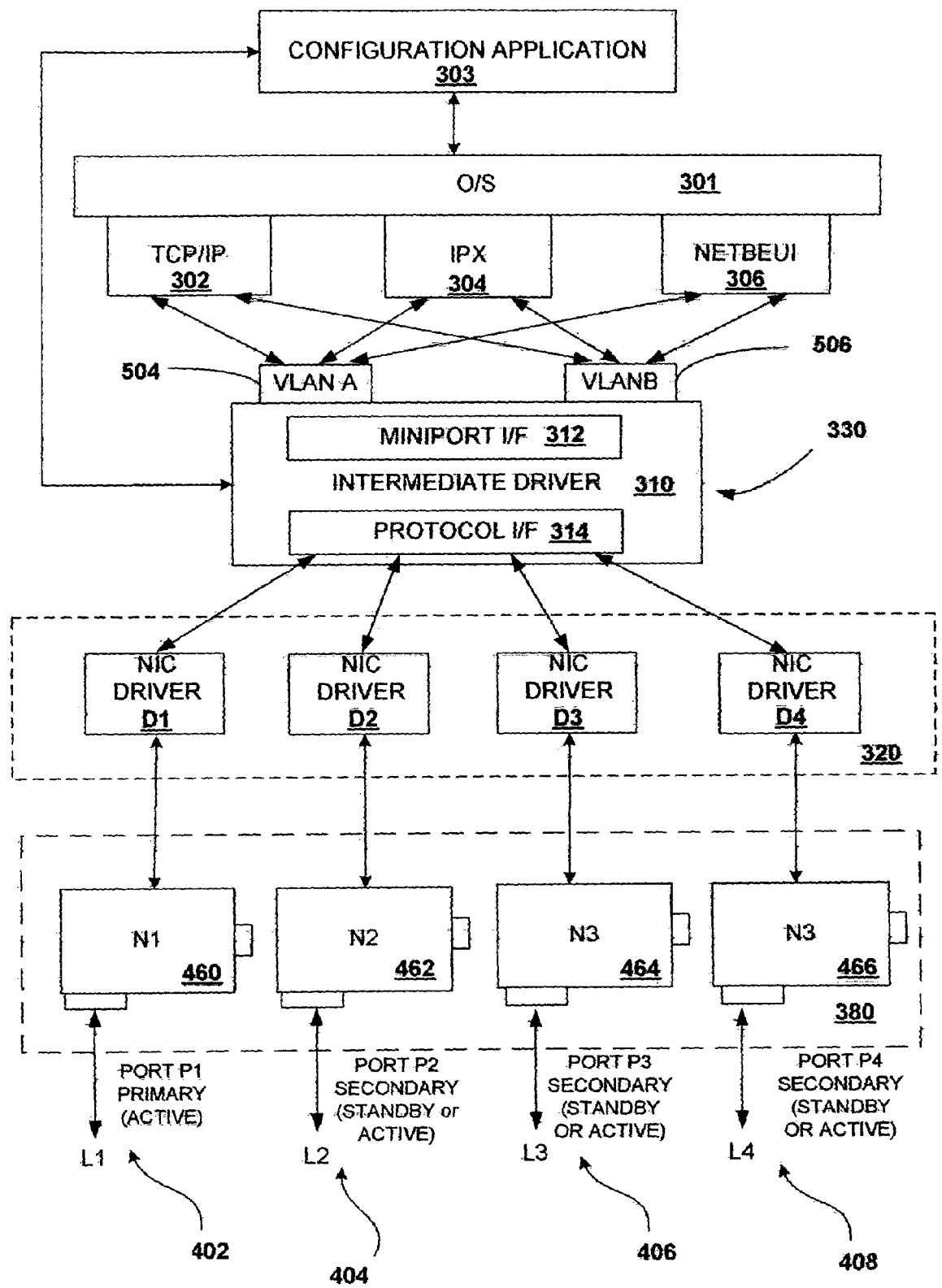
FIG. 2 is a block diagram of a network that illustrates some features that may be used to couple the computer system of FIG. 1 to the network in accordance with an embodiment of the present invention.

A more detailed discussion regarding a teaming mechanism that may be used to implement an embodiment of the invention is now presented with reference to FIG. 2. As previously mentioned, for a team of network adapter ports to operate as a single virtual adapter, all devices on the network must communicate with the team using only one layer-2 address and one layer-3 address. Put another way, a network device must see only one layer-2 (e.g. MAC) address and one protocol address (e.g. IP, IPX) for a team, regardless of the number of adapter ports that make up the team. For Ethernet networks, devices that wish to communicate with one another must first ascertain the MAC address for each device in accordance with the address resolution protocol (ARP). The requesting device issues an ARP request for a particular IP address, and the device assigned to that IP address recognizes the request is directed to it and responds to the requesting device with its MAC address. The requesting device stores that MAC address in association with the IP address in an ARP table it maintains. The IP protocol address of a team will have only one entry in the requesting device's ARP table (i.e. one MAC address and one IP address) for the entire team.

The computer system 100 of FIG. 2 is configured with four NICs N1 460 through N4 466, each providing one NIC port 402-408. Each NIC port has a corresponding instantiation of the appropriate drivers D1, D2, D3 and D4 for purposes of illustration. Each instantiation of a driver D1 through D4 is the driver necessary to control each the corresponding ports. The computer system 100 has installed within it an appropriate operating system (O/S) 301 that supports networking, such as Microsoft NT, Novell Netware, Windows 2000, or any other suitable network operating system. The O/S 301 includes, supports or is otherwise loaded with the appropriate software and code to support one or more communication protocols, such as TCP/IP 302, IPX (Internet Protocol eXchange) 304, NetBEUI (NETwork BIOS End User Interface) 306, etc. A configuration application program 303 runs in conjunction with O/S 301.

An embodiment of configuration application 303 provides a graphical user interface (GUI) through which users may program configuration information regarding the initial teaming of the NICs. Additionally, the configuration application 303 receives current configuration information from the teaming driver 310 that can be displayed to the user using the first GUI on display 112, including the status of the resources for its team (e.g. "failed," "standby" and/or "active"). Techniques for graphically displaying teaming configurations and resource status are disclosed in detail in U.S. Pat. No. 6,229, 538 entitled "Port-Centric Graphic Representations of Network Controllers," which is incorporated herein in its entirety by this reference. Application 303 provides commands by which the resources can be allocated to teams and reconfigured. A user can interact with the configuration program 303 through the GUIs via one or more input devices, such as the mouse 114 and the keyboard 116 and one or more output devices, such as the display 112. It will be appreciated that the GUI can be used remotely to access configuration program 303, such as over a local network or the Internet for example.

A hierarchy of layers within the OIS 301, each performing a distinct function and passing information between one another, enables communication with an operating system of another network device over the network. For example, four such layers have been added to Windows 2000: the Miniport I/F Layer 312, the Protocol I/F Layer 314, the Intermediate Driver Layer 310 and the Network Driver Interface Specification (NDIS) (not shown). The Protocol I/F Layer 314 is responsible for protocol addresses and for translating protocol addresses to MAC addresses. It also provides an interface between the protocol stacks 302; 304 and 306 and the NDIS layer. The drivers for controlling each of the network adapter or NIC ports reside at the Miniport I/F Layer 312 and are typically written and provided by the vendor of the network adapter hardware. The NDIS layer is provided by Microsoft, along with its O/S, to handle communications between the Miniport Driver Layer 312 and the Protocol I/F Layer 314.

To accomplish teaming of a plurality of network adapters, an instance of an intermediate driver residing at the Intermediate Driver Layer 310 is interposed between the Miniport Driver Layer 312 and the NDIS. The Intermediate Driver Layer 310 is not really a driver per se because it does not actually control any hardware. Rather, the intermediate driver causes the miniport drivers for each of the NIC ports to be teamed to function seamlessly as one virtual driver 320 that interfaces with the NDIS layer. For each team of NIC adapter ports, there will be a separate instance of the intermediate driver at the Intermediate Driver Layer 310, each instance being used to tie together those NIC drivers that correspond to the NIC ports belonging to that team. Each instance of a teaming driver presents a single virtual interface to each instance of a protocol (302, 304 and or 306) being executed by the O/S 301. That virtual interface is assigned one IP address. If the server is configured with VLANs (e.g. VLANs A 504 and B 506), virtual interfaces for each VLAN are presented to the protocol layer, with each VLAN having been assigned its own unique protocol address.

The intermediate driver 310 also presents a single protocol interface to each of the NIC drivers D1-D4 and the corresponding NIC ports 402, 404, 406 and 408 of NICs N1 460, N2 462, N3 464, and N4 466. Because each instance of the intermediate driver 310 can be used to combine two or more NIC drivers into a team, a user may configure multiple teams of any combination of the ports of those NICs currently installed on the computer system 100. By binding together two or more drivers corresponding to two or more ports of physical NICs, data can be transmitted and received through one of the two or more ports (in the case of an NFT team) or transmitted through all of the two or more ports and received through one for a TLB team), with the protocol stacks interacting with what appears to be only one logical device.

As previously discussed a fault tolerant team is typically employed where the throughput of a single NIC port is sufficient but fault tolerance is important. As an example, the NIC ports 402, 404, 406 and 408, providing redundant links L1 through L4 to a network can be configured as a network fault tolerance (NFT) team. For an NFT team, one of the NMC ports (e.g. port 402 of N1 460) is initially assigned as the primary and NIC N1 460 is placed in the "active" mode. This assignment can be accomplished by default (e.g. the teaming driver 310 simply chooses the team member located in the lowest numbered slot as the primary member and assigns it the team MAC address) or manually through the GUI and configuration application 303. For the NFT team, ports 404, 404, 406 and 408 are designated as "secondary" and their respective NMCs N2 462, N3 464 and N4 466 are placed in a "standby" mode.

The primary team member transmits and receives all packets on behalf of the team. If the active link (i.e. L1) fails or is disabled for any reason, the computer system 100 (the teaming driver 310 specifically) can detect this failure and switch to one of the secondary team members by rendering it the active (and primary) member of the team while placing the failed member into a failed mode until it is repaired. This process is sometimes referred to as "failover" and involves reassigning the team MAC address to the NIC port that is to be the new primary. Communication between computer system 100 and devices in a network to which the team is coupled is thereby maintained without any significant interruption. Those of skill in the art will recognize that an embodiment of an NFT team can have any number of redundant links in an NFT team, and that one link of the team will be active and all of the others will be in standby.

Figure 3:
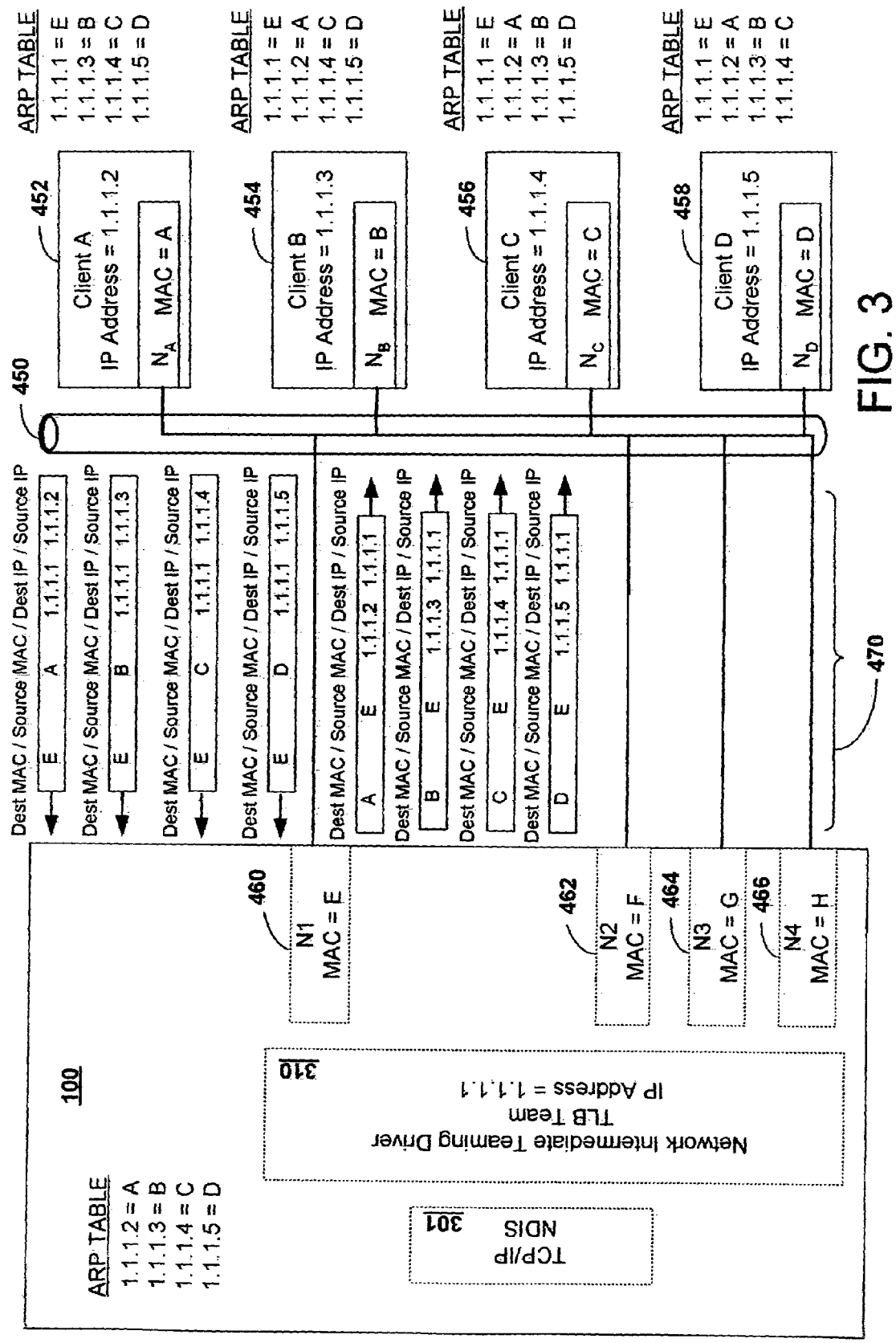
FIG. 3 is a block diagram illustrating the traffic flow of an embodiment of an NFT team.

FIG. 3 illustrates the traffic flow 470 between the network resources NICs N1-N4, configured as an NFT team) and a network 450 through which client devices A 452, B 454, C 456 and D 458 communicate with server 100. The team MAC address is E and has been assigned to NIC N1 460, the primary member of the team. All of the other resources are secondary members and are placed in standby mode until needed. Thus, primary NIC N1 460 transmits all traffic to the clients and receives all traffic from the clients. One of the members of the team will be activated only in the event that NIC N1 460 fails, at which time it will be assigned the team MAC address E and as such becomes the primary for the team. The team is recognized as a single virtual device as indicated by the single entry for system 100 in the respective ARP tables of client devices A 452, B 454, C 456 and D 458.

The network resources NICs N1 460, N2 462, N3 464, and N4 466 of FIG. 2 can also be configured as a TLB team. Transmit load balancing (TLB) teams are typically employed when fault tolerance is desired as well as data throughput greater than that available through the single primary resource of an NFT team. This is common for situations such as when the computer system 100 is acting as a database server and its primary role is to transmit data to numerous clients. In this example, its receive throughput requirements are significantly less than its transmit throughput requirements and the receive throughput requirements can be handled by the primary adapter alone. For a TLB team, the primary (i.e. port 402 of NIC 460) is again operable to send and receive data. The difference between the two team types is that for an NFT team, the secondary team members are in standby mode and the primary does all of the transmitting and receiving for the team, whereas for a TLB team the primary does all of the receiving and the secondary members are active for transmitting but not receiving. For the details of techniques by which the system 100 can detect NIC failure and then initiate and perform a failover, please see U.S. Pat. No. 6,272,113 entitled "Network Controller System that uses Multicast Heartbeat Packets," which was issued on Aug, 7, 2001.

Figure 4A:
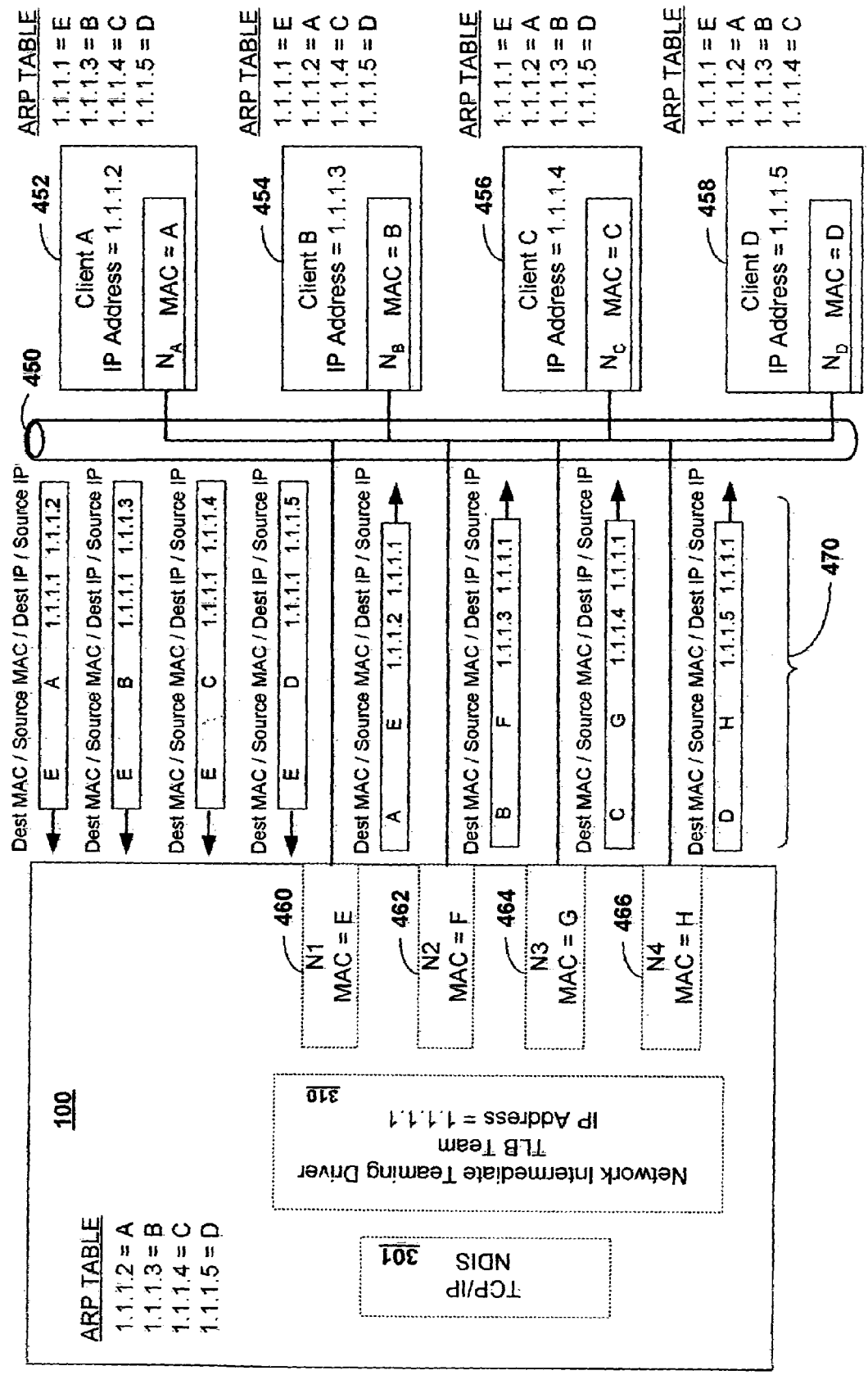
FIG. 4A is a block diagram illustrating the traffic flow of an embodiment of a TLB team.

FIG. 4A illustrates the traffic flow 470 between a TLB team and a network 450 by which the client devices A 452, B 454, C 456 and D 458 communicate with server 100. The team MAC address is E and has been assigned to NIC N1 460, the primary member of the team. All of the other resources are secondary members and are active to transmit data only. Once again, if the primary NIC N1 460 fails, one of the other secondary members is assigned the team MAC address E and is enabled to receive data transmitted by the clients to the team MAC address E. Data transmitted by the team is load-balanced between the new primary, as well as the remaining secondary members that are still functioning. Again, the client devices A 452, B 454, C 456 and D 458 see the team of resources NICs N1-N4 as a single virtual device as indicated by the single entry for system 100 in their respective ARP tables.

As can be seen from FIG. 4A, each active member (i.e. not failed) of the team transmits data with its own MAC address. This is not a problem for Ethernet networks employing IP as its network protocol because all source MAC addresses are stripped from packets by the receiving network devices and only the source team IP address is used to respond back to the team. For networks employing IPX as a protocol, this is not an issue because the source MAC address is embedded within the IPX protocol address. During an ARP request to the team, however, only the team MAC address is returned to the requesting device and is stored in its ARP table as indicated.

Figure 4B:
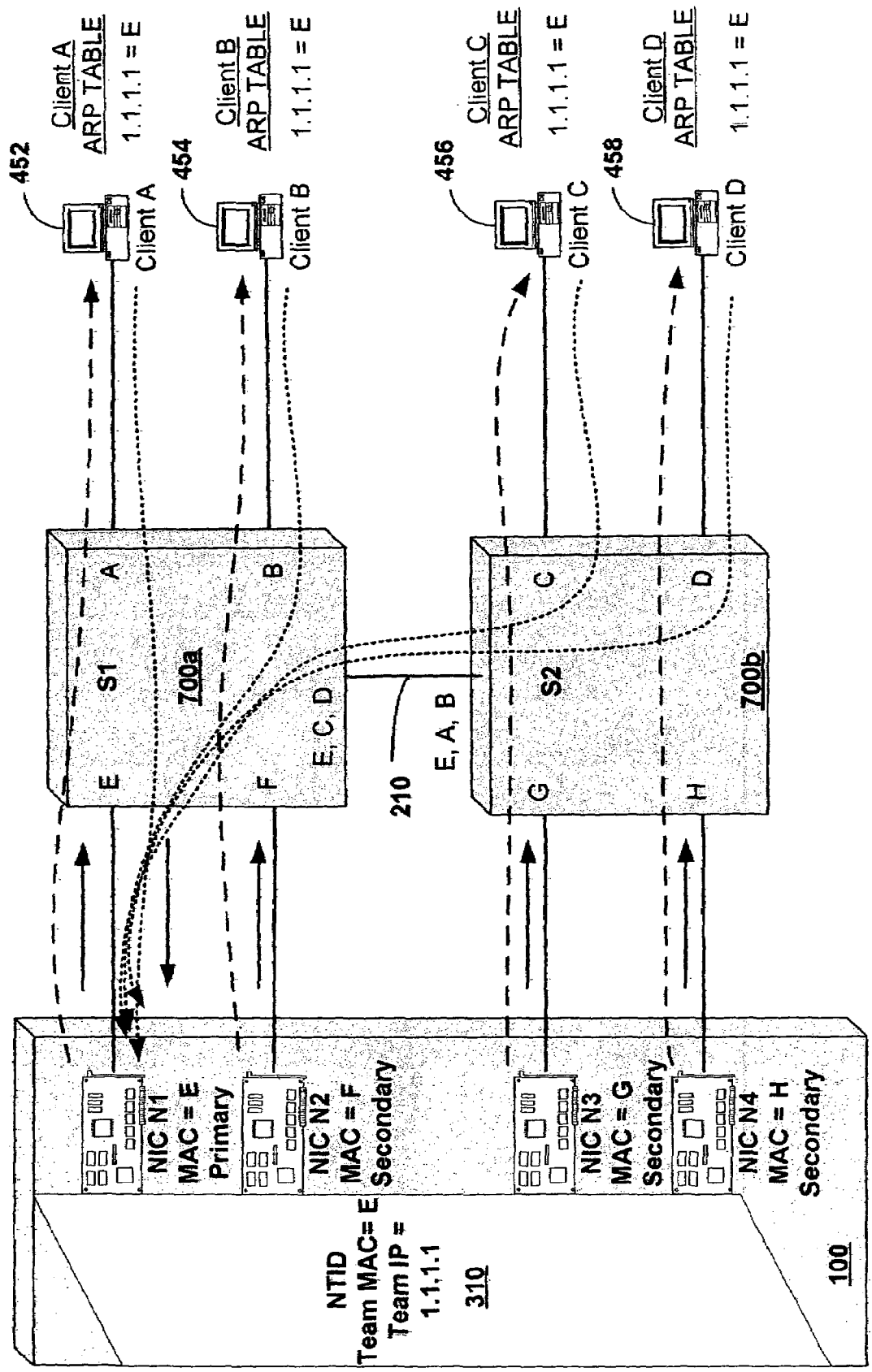
FIG. 4B is a block diagram of the TLB team of FIG. 4A within a redundant network topology.

FIG. 4B illustrates the application of the TLB team of FIG. 4A within a network topology wherein team members are split between redundant switches S1 700*a* and S2 700*b* through which the system 100 is coupled to the network. This redundant switch topology is often implemented to avoid a single point of failure with respect to the network's interface to a server, for example. In this example, team NICs N1 and N2 are typically coupled to a core network (not shown) through redundant switch S1 700*a*. Team NICs N3 and N4 are typically coupled to the core network through redundant switch S2 700*b*. Each switch can also couple a plurality of local client devices to the system 100 as represented by Clients A 452 and B 454 (switch S1 700*a*) and Clients C 456 and D 458 (switch S2 700*b*). In the example of FIG. 4B, NIC N1 is designated to be the TLB team primary and as such is assigned the team MAC address E. The TLB team operates as previously described, with all team members transmitting data and only the primary member receiving data and all clients seeing the team as a single virtual device with a single MAC address.

It should be noted that the example of FIG. 4B illustrates a load-balancing algorithm (residing within and executed by the teaming driver 310) wherein the conversations currently assigned to each team member happen to be with clients directly coupled to the switch to which each NIC is also directly coupled. Those of skill in the art will recognize that it is possible that load-balancing assignments could also occur that might require team members to transmit data for conversations to a client not directly coupled to the switch to which the team member is coupled. In that case, transmitted data would also flow between the switches over switch cross-connect 210 or through a core switch (not shown) coupling the S1 700*a* and S2 700*b* to the core network.

Figure 5A:
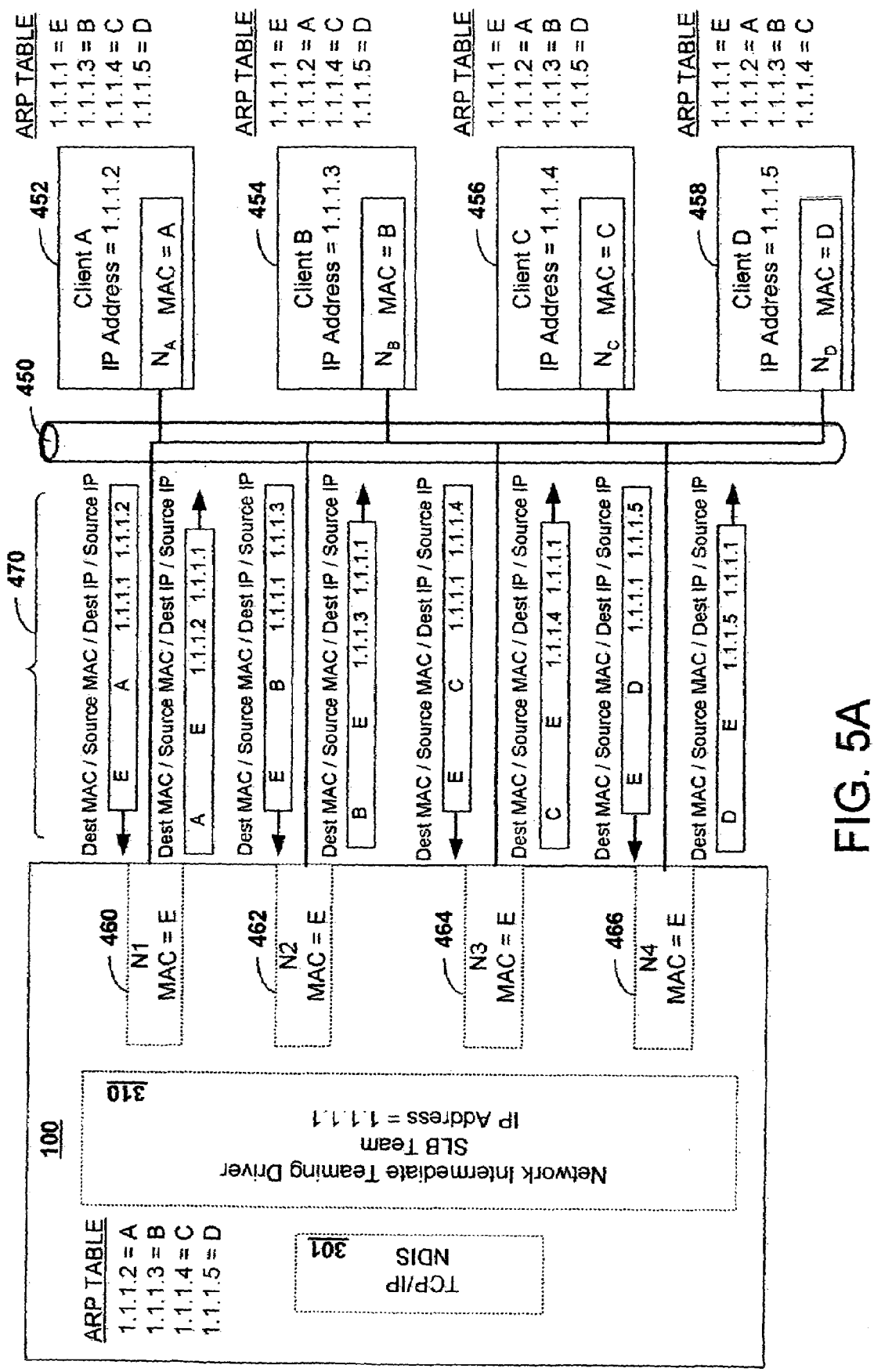
FIG. 5A is a block diagram illustrating the traffic flow of an embodiment of an SLB team.

As previously discussed, switch-assisted load balancing teams (SLB) teams can provide not only load balancing of transmitted data, but also load-balancing of data received by the team. To implement this team type, a switch that is operative to perform port-trunking can be employed to load-balance the data received by the switch for the team. There are numerous port trunking algorithms known to those of skill in the art, including Cisco's EtherChannel. FIG. 5A illustrates the traffic flow 470 from an SLB team through a network 450 through which client devices A 452, B 454, C 456 and D 458 communicate with server 100. The team MAC address=E and has been assigned to all NICs N1 460, N2 462, N3 464, and N4 466 and the clients A 452, B 454, C 456 and D 458 still see the SLB team as a single virtual resource as indicated by the single entry for the team in their respective ARP tables. All of the resources are therefore active to transmit data as well as to receive data addressed to the team MAC address=E. The switch (not shown) sees the links L1-L4 corresponding to NICs N1-N4 as a virtual port trunk. A Switch (not shown) distributes data frames it receives from clients addressed to team MAC address E to any one of the active team members in accordance with the implemented load-balancing algorithm. In this case, all active members of the team transmit using the team address as well. Should any of the team members fail, the team continues to operate as described, albeit with a reduced bandwidth.

Figure 5B:
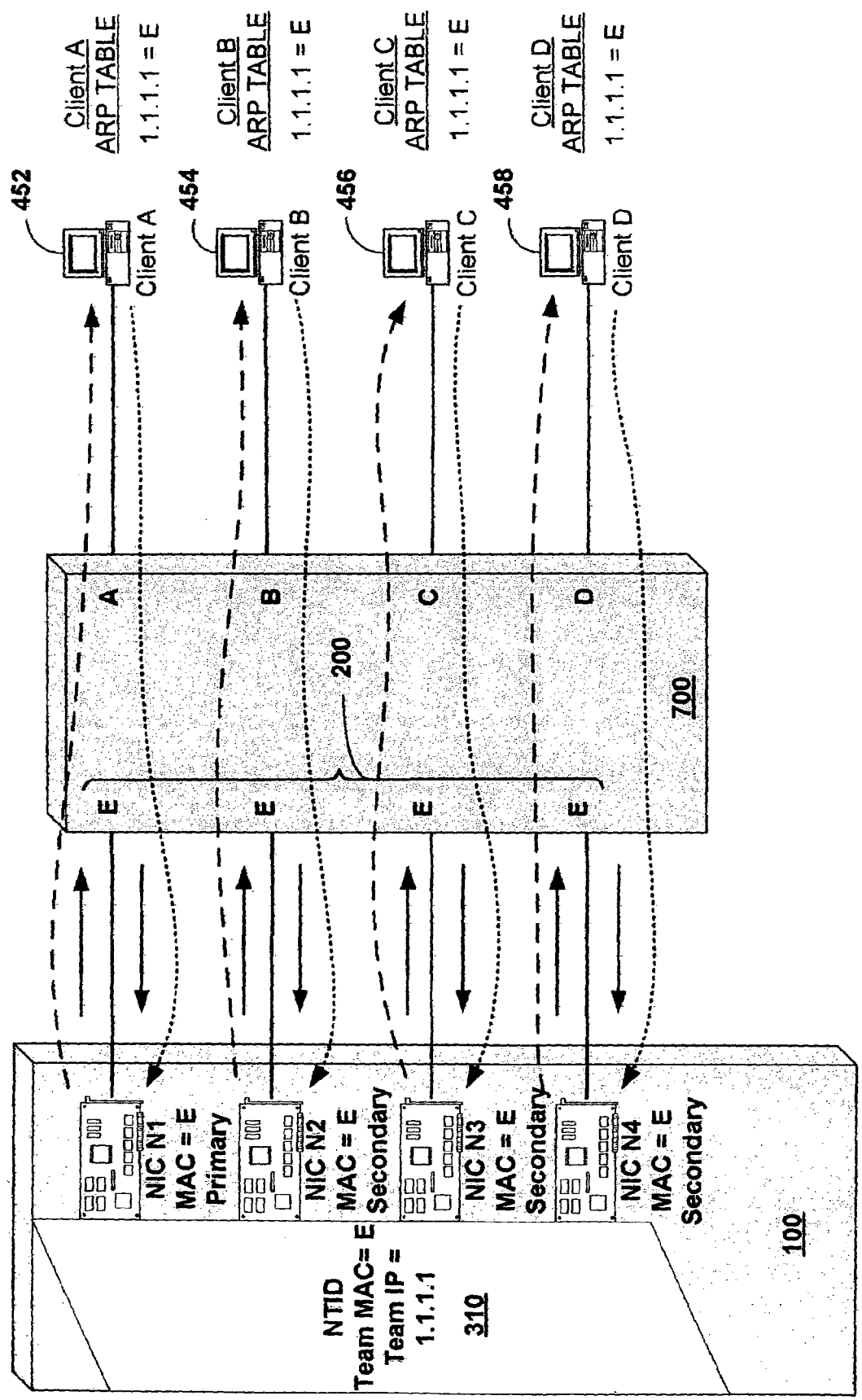
FIG. 5B is a block diagram of the SLB team of FIG. 5A within a single-switch network topology.

FIG. 5B illustrates data flow for an application of the SLB team of FIG. 5A including a switch 700 that is enabled for port trunking (i.e. treating its output ports coupled to each of the team members as a single virtual trunk). Consistent with the requirements of an SLB team, all team members NIC N1-N4 are coupled to the switch 700. There is no team member designated to be primary, as is the case for TLB and NFT teams as previously described. All team members are enabled to receive data addressed to MAC address E and they all send data using the same MAC address. The switch 700 sees all of its ports coupled to one of the team members as a single virtual port 200, and any of the frames addressed to the team address MAC=E can be output to the team on anyone of the ports of the virtual port 200 in accordance with the load-balancing algorithm employed by the switch.

Previously, an SLB team was limited to the non-redundant topology of FIG. 5B, and implementation of redundant topologies such as that of FIG. 4B were limited to implementation only with TLB or NFT teams. With features of the present invention incorporated within system 100, and particularly within teaming driver 310 and configuration program 303, topologies can now be handled that provide both redundant connectivity as well as aggregated receive throughput through SLB load-balancing in addition to the topologies of FIGS. 4B and 5B. A more detailed discussion of the features of the present invention and the expanded teaming capabilities permitted by the present invention are presented below with reference to FIGS. 6A-C, 7 and 8.

Figure 6A:
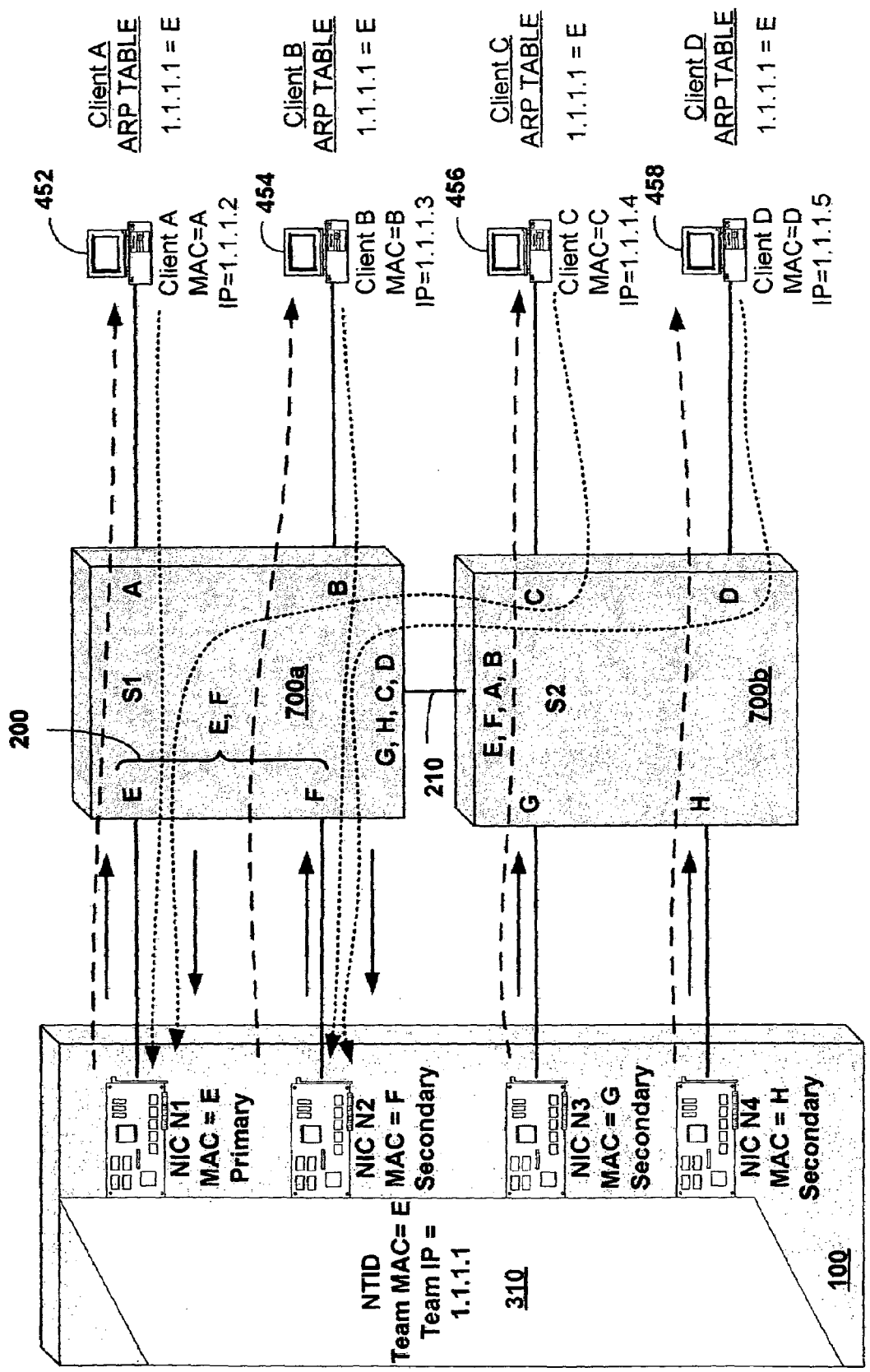
FIGS. 6A and 6B illustrate the TLB team configuration of 4A having a sub-TLB team as its virtual primary within a redundant network topology in accordance with the present invention.

FIG. 6A illustrates data flow for an embodiment of the invention wherein the team is coupled to the switch redundant topology employed with the TLB team of FIG. 4B. In the embodiment, either one or both of the switches S1 700a and S2 700b can be port-trunking enabled switches capable of performing any port-trunking algorithm that can be used to support switch assisted load balancing (SLB). In response to instructions from the configuration program 303, the teaming driver configures the resources N1-N4 as a TLB team and designates one of the team members as the primary for the team. In the example embodiment of FIG. 6A, NIC N1 is assigned the team MAC address. As part of the process creating the TLB team, all team members are enabled by the teaming driver to transmit data using their own MAC addresses.

Further in response to instructions received from the configuration program 303, the teaming driver apportions the resources NICs N1-N4 into groups in accordance with the switch to which they are coupled, with the set of members for each group being unique and having at least one member. In the example of FIG. 6A, NICs N1 and N2 fall into a first group as being the set of members of the team coupled to switch S1 700a and NICs N3 and N4 fall into a second group as being the set of members of the team coupled to the second switch S2 700b. The fact that the first group includes the designated primary NIC N1 renders the first group the primary group.

In response to instructions from the configuration program 303, the teaming driver 310 enables all of the members of the primary group to receive data on the team MAC address. The members of non-primary (i.e. secondary) groups are not enabled to receive data. The choice of which team member to designate as the primary can be based on a number of criteria, including how many members of the team are part of the group, what the aggregate throughput of the groups members is compared to that of the other group(s), and whether the primary group will be in fact coupled to a switch that is port-trunking enabled. A user can manually configure the team, or an automated configuration process could be employed that makes this decision based on a set of configuration rules and the current status and configuration of the network to which the team is coupled. An automated teaming configurator is disclosed in U.S. application Ser. No. 11/048,524 entitled "Dynamic Allocation and Configuration of a Computer System's Network Resources," which is incorporated herein in its entirety by this reference. In an embodiment, a user may input manual grouping selections or configuration rules and network configuration information through the user interface (e.g. graphical user interface (GUI)) and configuration program (303, FIG. 2).

Thus, the primary group essentially functions as an SLB sub-team within the TLB team, to provide a virtual primary to the TLB team having enhanced receive throughput capability. Put another way, the members of the primary group have been teamed to create a throughput aggregated virtual primary resource of the TLB team. The first group comprising the SLB sub-team (e.g. NICs N1 and N2) meets the requirement for SLB teams that all members are coupled to the same switch to create port trunk 200. Those secondary members of the second group and coupled to the second switch S2 700b are not part of any SLB sub-team, although still part of the overall TLB team. It will be appreciated that in the example of FIG. 6A, the maximum receive bandwidth of the TLB team has been doubled, while the TLB team remains split across multiple switches to achieve the benefits of switch redundancy. Those of skill in the art will recognize that further embodiments might include any number of network devices (e.g. switches) and groups, and that each group can vary in the number of team members comprising it.

Figure 6B:
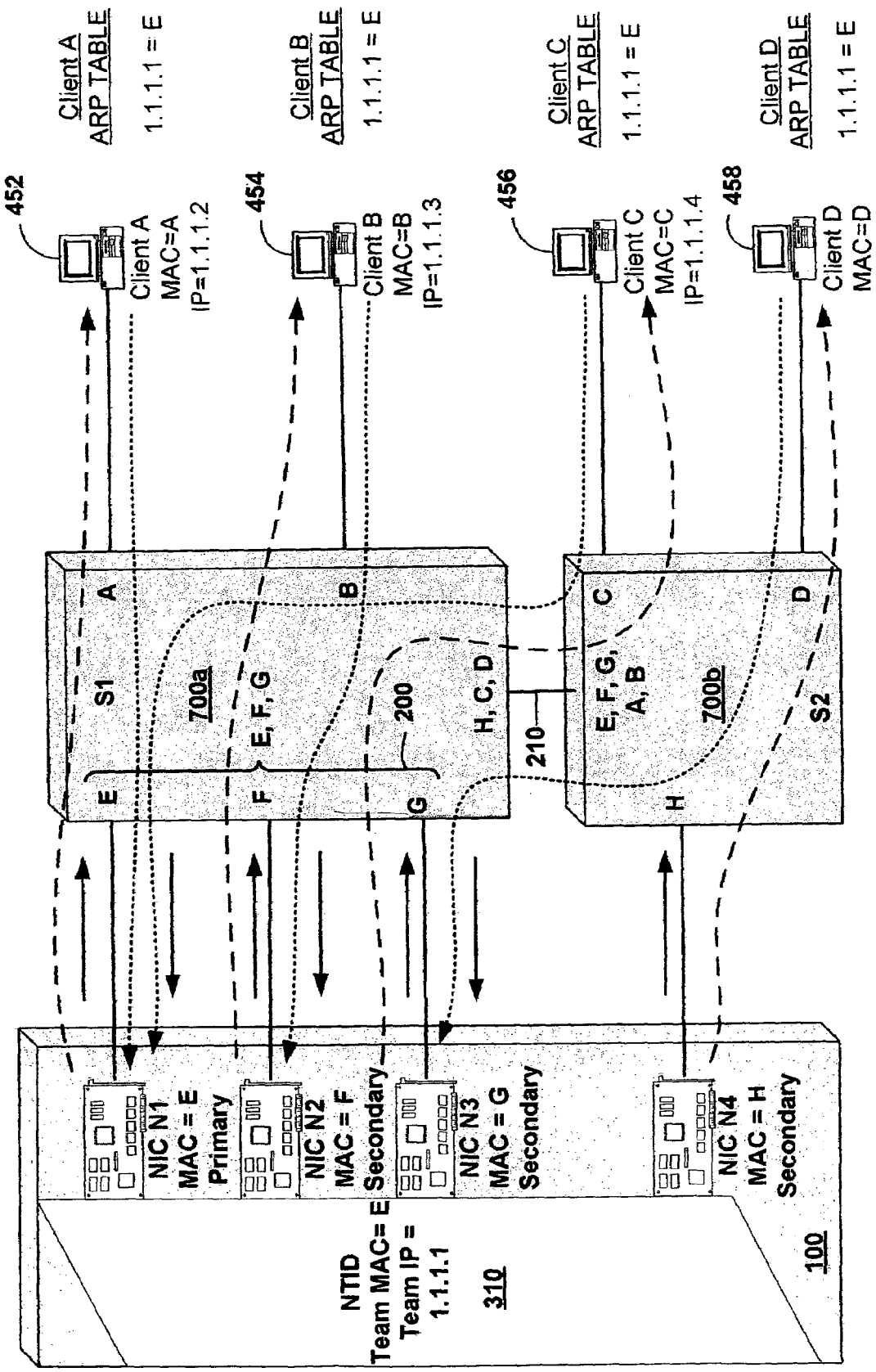

FIG. 6B illustrates an embodiment of the invention wherein the resources are asymmetrically assigned to the two groups such that the receive throughput is maximized for a given number of available resources by grouping all but one of the available resources within the group initially chosen to be the primary group. Those of skill in the art will appreciate that while this configuration maximizes receive throughput for normal operation, should conditions warrant a failover to the second group to, for example re-establish connectivity with the core network, minimal receive throughput will be available so long as the failed condition exists.

Figure 7A:
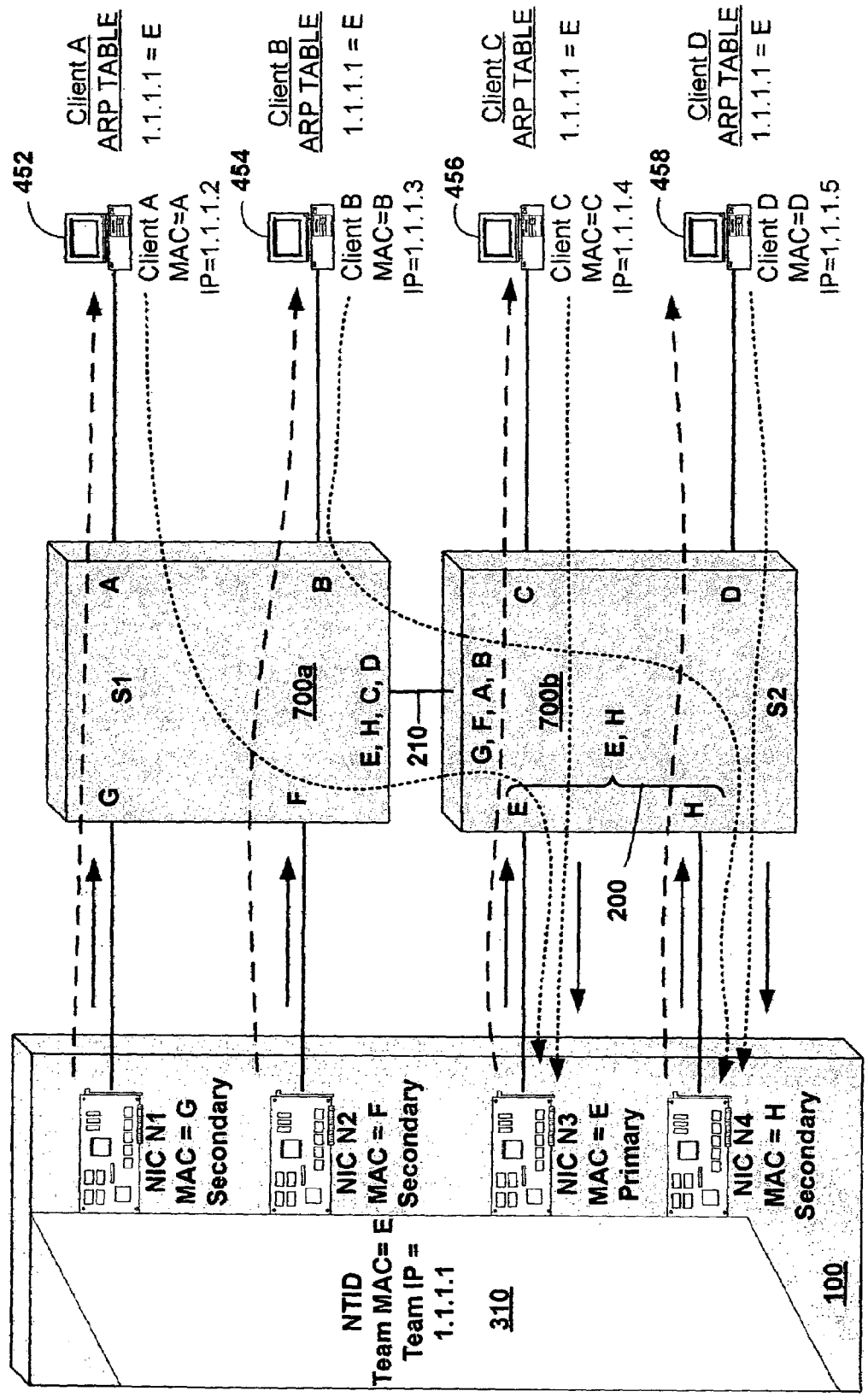
FIGS. 7A and 7B illustrate failover scenarios for the TLB team configuration of FIG. 6A in accordance with the present invention.

In an embodiment, if the primary member to which the team MAC address has been assigned fails, a simple failover to another first group NIC port will maintain the same connectivity, albeit at a reduced maximum receive throughput. If S2 700b is also port-trunking (i.e. load-balance) enabled, a failover can be initiated to one of the secondary groups by re-assigning the team MAC address to one of the members of that group (e.g. N2 or N3 of the second group in FIG. 6A). The result of this failover scenario is illustrated in FIG. 7A, wherein NIC N3 is now the primary NIC and is assigned the team MAC address=E. During this failover, the teaming driver enables all of the team members in the new primary group (e.g. N2 and N3) to receive data frames addressed to MAC address=E and receiving is disabled on NICs in the first group (i.e. the previous primary). Thus, the second group now becomes the SLB sub-team within the TLB team and the maximum receive throughput of the team is maintained through port trunk 210. Thus, failover can be set up to detect whenever the currently designated primary group's aggregated throughput falls below that of the originally designated primary group.

Figure 7B:
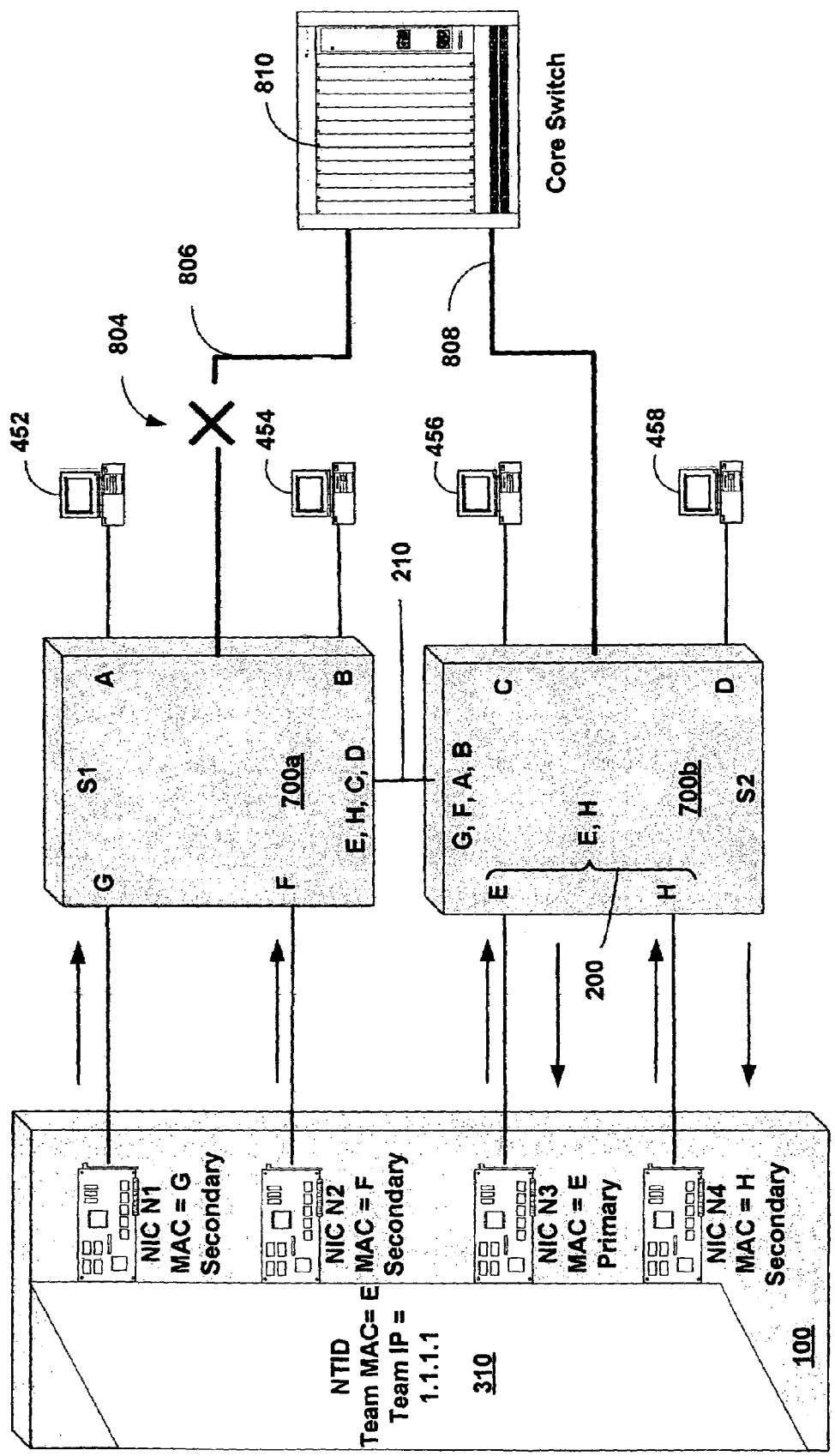

With application to the topology shown in FIG. 7B, the failover scenario of FIG. 7A can also be employed should S1 700a fail, thus causing an interruption in connectivity between the system 100 and a core switch 810 of the network.

The system 100 (and particularly teaming driver 310) can be configured to detect this split segment condition and initiate the failover to a member of a secondary group. In this example, NIC N3 has been assigned the team MAC address=E and thus the second group has become the primary group. If a failure 804 occurs and no cross-connect 210 exists or it is unavailable, a split LAN condition can exist because the primary has been isolated from the core switch 810. Failing over to the second group would serve to re-connect the system 100 to the core network (not shown) through uplink 808 and core switch 810. Techniques for detecting and recovering from such split segment conditions are disclosed in U.S. patent application Ser. No. 11/048,523 entitled "Automated Recovery from a Split Segment Condition in a Layer2 Network for Teamed Network Resources of a Computer System," which is incorporated herein in its entirety by this reference.

If the uplink 806 is interrupted due to, for example, failure 804, communication may still remain through cross-connect 210 and thus failover to the second group may not be necessary. However, a system capable of detecting cross-connect 210 as a non-optimal path to the server may be used to initiate the failover to the second group to establish a more optimal path through a higher-speed uplink 808. Such a detection technique is disclosed in U.S. application Ser. No. 11/048,520 entitled "Automated Selection of an Optimal Path between a Core Switch and Teamed Network Resources of a Computer System," which is incorporated herein in its entirety by this reference. Those of skill in the art will appreciate that any number of reasons may make a failover to a secondary group desirable.

Figure 8:
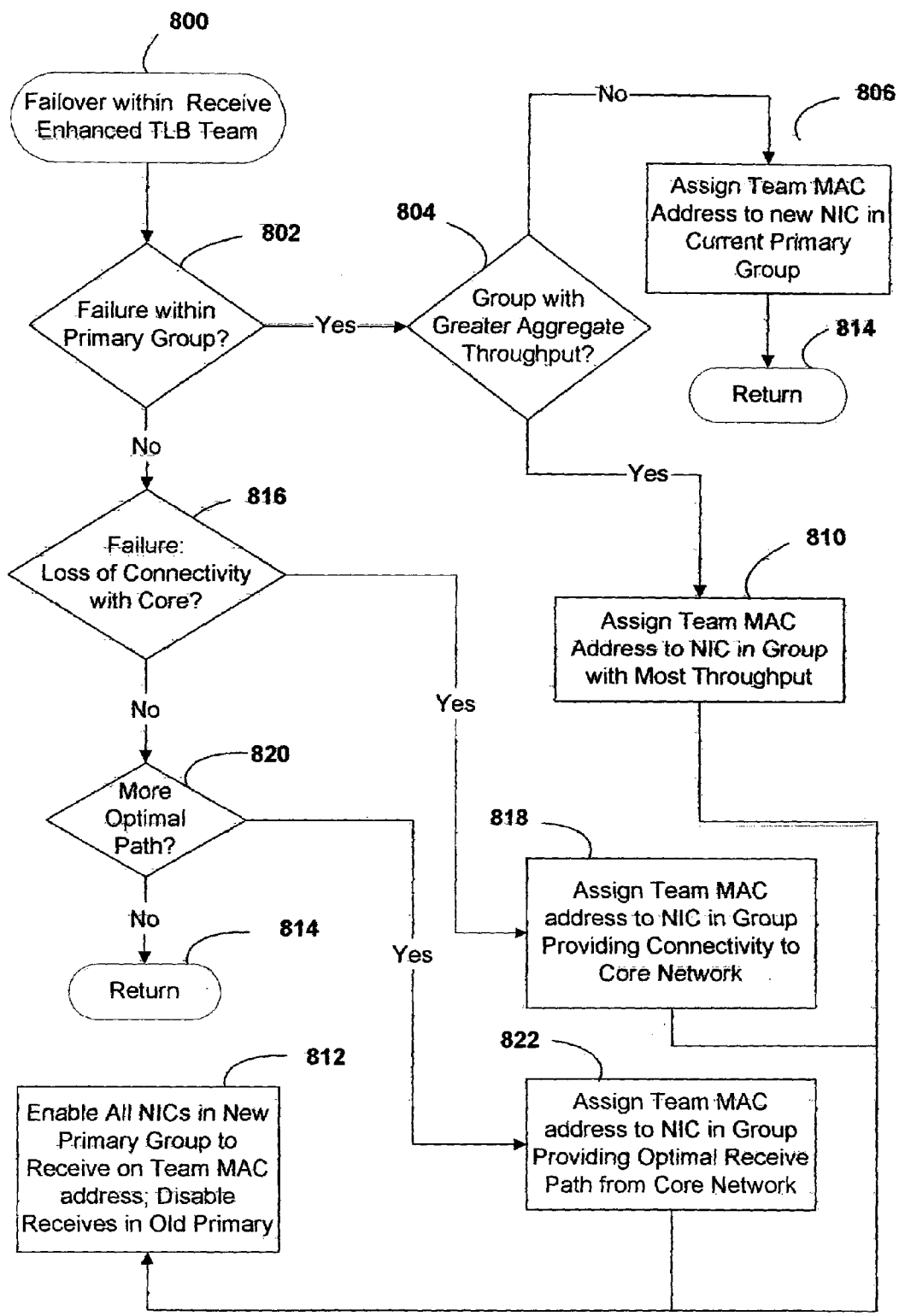
FIG. 8 is a flow diagram illustrating an embodiment of a failover process in accordance with the present invention.

FIG. 8 is a procedural flow diagram that illustrates an embodiment of a failover process that may be employed in accordance with the invention. Upon detection of a failover event, such as a loss of NIC in the primary group at 802, a loss of connectivity to the core of the network at 816, or the availability of a better receive path from the core of the network at 820, the teaming driver performs a failover process 800. If the failure is one that leads to the primary group having less throughput that an available secondary group handled at decision block 802, the teaming driver 310 assigns the team MAC address to a member of the secondary group having the better throughput at 810 and enables the other members of the new primary group to receive on the team MAC address at 812. The active members of the previous primary group are disabled from reading at 812 as well.

If the failover is the result of a loss of connectivity, the teaming driver 310 assigns the team MAC address to one of the resources in a secondary group at 818 that will re-establish connectivity between the core and the system 100. The teaming driver 310 then enables the remaining members to receive data on the team address and disables the members of the previous primary group from receiving data at 812. If the teaming driver detects that a more optimal receive path to the primary than that provided by the current primary group, the teaming driver 310 assigns the team MAC address to a member of the secondary group coupled to the more optimal path at 822 and enables all other members of that group to receive data on the team Mac address at 812. Once again, the members of the previous primary group are disabled from receiving data.

Embodiments of the invention enable network users to combine the benefits of receive load-balancing while achieving the benefits of redundant network topologies. Through a system's teaming configuration program interface, users can assign network resources (manually or automatically based on pre-established resource allocation rules) of a system such as a server to two or more groups. Each group includes at least one of the resources and is coupled to a different one of multiple network devices (e.g. switch) to provide redundant connections for the system to the network. The groups are the configured as a TLB team, with the primary for the TLB team being assigned preferably but not necessarily to a group with at least two team members. The switch to which the primary group is coupled is enabled for receive load-balancing and all of the members of the primary group are enabled to receive data addressed to the team MAC address. In this way, the primary group becomes an SLB sub-team of the TLB team, increasing the receive throughput of the TLB team by creating a higher bandwidth virtual resource for the primary of the TLB team. A failover that establishes a different primary group can be effectuated by assigning the team MAC address to one of the members of the group to be the new primary one and enabling all team members of the new primary group to receive data addressed to the team MAC address. Members of the previous primary group are disabled from receiving data.

It should be noted that while FIGS. 3, 4A-B, and 5A-B illustrate topologies configurable by previous incarnations of the teaming driver and configuration program, the teaming driver and configuration program of the present invention are considered incorporated within those FIGS. as they are still capable of configuring those topologies as well as those topologies illustrated in FIGS. 6A-B and 7A-B.

What is claimed is:

1. A method of teaming network resources of a computer system comprising:
    configuring plural adapter cards as a transmit load-balanced (TLB) team;
    designating one of the plural adapter cards as a primary for the TBL team;
    assigning the primary a media access control (MAC) address; and
    dividing the plural adapter cards in the TLB team into a primary group that includes the primary and is coupled to a first switch and a non-primary group that is coupled to a second switch, wherein the first and second switches are coupled to enable the primary group to function as a switch-assisted load-balanced (SLB) sub-team of the TLB team.

2. The method of claim 1 further comprising:
    enabling adapter cards in the primary group to receive data on the MAC address, wherein adapter cards on the non-primary group are not enabled to receive data.

3. The method of claim 1 further comprising:
    designating an adapter card in the non-primary group as a new primary when the primary fails;
    assigning the new primary the MAC address.

4. The method of claim 1 wherein the adapter cards of the non-primary group are not part of any SLB sub-team but are part of the TLB team.

5. The method of claim 1 wherein the plural adapter cards provide both redundant connectivity of TLB teams and aggregated receive throughput through SLB load-balancing and transmit data using their own MAC addresses.

6. A method of teaming network resources of a computer system comprising:
    establishing a virtual primary for a team, said establishing further comprising;
    assigning a team layer2 address to a primary one of the network resources;
    apportioning each of the one or more network resources into one of two or more groups, the resources of each of the groups having links coupled in parallel to one of two or more network devices each providing connectivity between the system and a network, the group including the primary resource being the primary group;

enabling the primary group to function as a transmit load-balanced (TLB) team that aggregates and load-balances data transmitted from two or more active members of the primary group to other devices over the network; and enabling the primary group to function as a switch-assisted load-balanced (SLB) team that aggregates and load-balances data received from the other devices over the network to the two or more active members of the primary group.

7. The method of claim 6 further comprising failing over to a different one of the groups, said failing over further comprising:

assigning the team layer2 address to one of the resources of the different one of the groups;

enabling the resources of the different one of the groups to receive on the team layer2 address; and enabling the network device to which the resources of the different one of the groups is coupled to load balance data received from the network among resources of the different group.

8. The method of claim 7 wherein said failing over is in response to a loss of connectivity between the resources of the primary group and a core of the network.

9. The method of claim 7 wherein said failing over is in response to the receive throughput of the primary group becoming less than the receive throughput of the different one of the groups.

10. The method of claim 7 wherein said failing over is in response to a condition wherein a receive path to the primary group from a core of the network is less optimal than a receive path between the core and the different group.

11. The method of claim 6 wherein said assigning and said apportioning are performed manually by user using a GUI (graphical user interface).

12. The method of claim 7 wherein said assigning and said apportioning are performed by a configurator in accordance with one or more predetermined rules for said assigning and said apportioning.

13. The method of claim 7 wherein said failing over is initiated by a configurator in accordance with one or more predetermined rules.

14. A computer system comprising:

a central processing unit (CPU);

a motherboard and bus system coupled to the CPU and including plural expansion slots first and second switches coupled together; and plural adapter cards coupled to the plural expansion slots, wherein the plural adapter cards are configured as a transmit load-balanced (TLB) team with one of the plural adapter cards being designated as a primary for the TBL team and being assigned a media access control (MAC) address, the plural adapter cards in the TLB team being divided into a primary group that includes the primary and is coupled to the first switch and a non-primary group that is coupled to the second switch, the first and second switches enabling the primary group to function as a switch-assisted load-balanced (SLB) sub-team of the TLB team.

15. The computer system of claim 14, wherein the first and second switches are port-trunking enabled switches that use a port-trunking algorithm to support switch-assisted load-balancing.

16. The computer system of claim 14 wherein the plural adapter cards transmit data using their own MAC addresses but receive data at the MAC address of the primary.

17. The computer system of claim 14 wherein adapter cards of the non-primary team are not part of any SLB sub-team but are part of the TLB team.

18. The computer system of claim 14 wherein adapter cards of the primary group receive data on the MAC address and adapter cards of the non-primary group are not enabled to receive data.

19. The computer system of claim 14 wherein an adapter card in the non-primary group is designated as a new primary when the primary fails, and the new primary is assigned the MAC address.

20. The computer system of claim 14 wherein the plural adapter cards provide both redundant connectivity of TLB teams and aggregated receive throughput through SLB load-balancing.

21. The computer system of claim 14 wherein the adapter cards are network interface cards (NICs).

22. The computer system of claim 14 wherein the first and second switches are coupled through a switch cross-connect.

23. The computer system of claim 14 wherein adapter cards in the primary group transmit data from the first switch and to the second switch to communicate with clients not directly coupled to the first switch but coupled to the second switch.

* * * * *

UNITED STATES PATENT AND TRADEMARK OFFICE
CERTIFICATE OF CORRECTION

PATENT NO. : 7,646,708 B2  Page 1 of 1
APPLICATION NO. : 11/208689
DATED : January 12, 2010
INVENTOR(S) : Michael Sean McGee et al.

It is certified that error appears in the above-identified patent and that said Letters Patent is hereby corrected as shown below:

In column 14, line 33, in Claim 1, delete "TBL" and insert -- TLB --, therefor.

In column 14, line 61, in Claim 6, delete "comprising;" and insert -- comprising: --, therefor.

In column 15, line 47, in Claim 14, delete "slots" and insert -- slots; --, therefor.

In column 16, line 6, in Claim 14, delete "TBL" and insert -- TLB --, therefor.

Signed and Sealed this

Sixth Day of April, 2010

David J. Kappos
*Director of the United States Patent and Trademark Office*